Feb. 12, 1946.  C. BUCKEL  2,394,840
TRAILER BRAKE
Filed Oct. 16, 1944   2 Sheets-Sheet 1
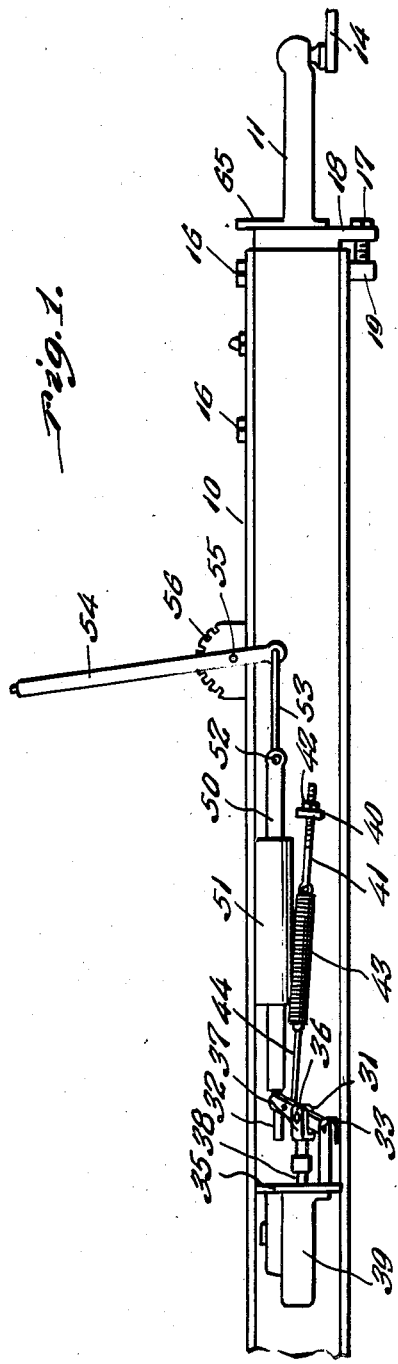
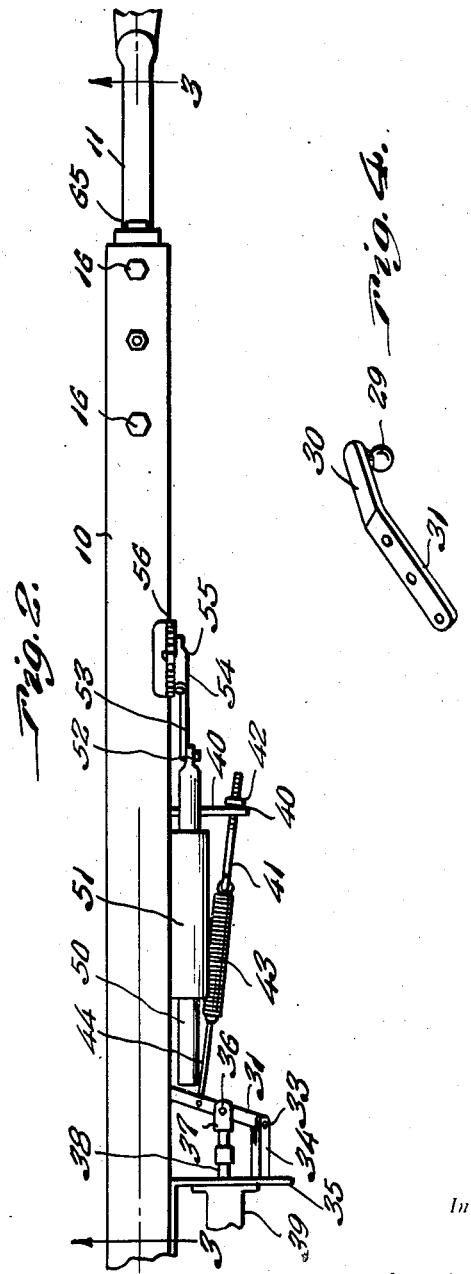
Inventor
Charles Buckel
By Clarence A. O'Brien
and Harvey B. Jacobson
Attorneys Feb. 12, 1946.     C. BUCKEL     2,394,840
TRAILER BRAKE
Filed Oct. 16, 1944     2 Sheets-Sheet 2
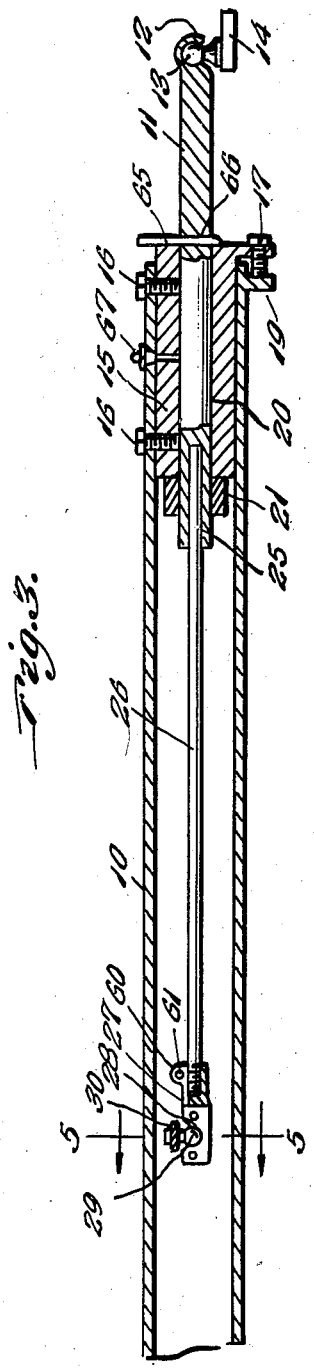
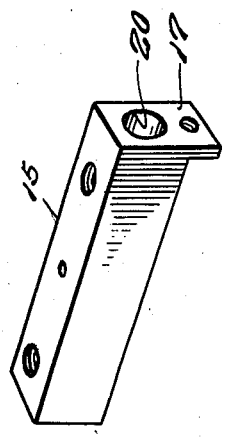
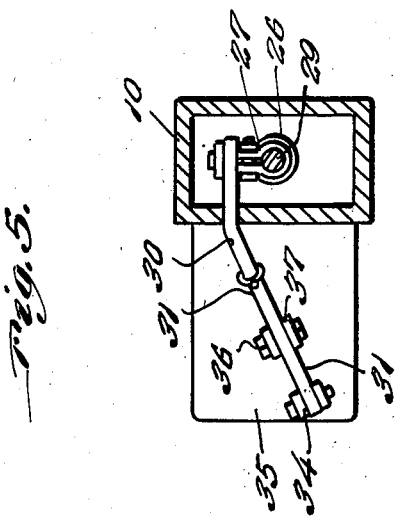
Inventor
Charles Buckel
By Clarence A. O'Brien
and Harvey B. Jacobson
Attorneys Patented Feb. 12, 1946

2,394,840

UNITED STATES PATENT OFFICE 2,394,840

TRAILER BRAKE

Charles Buckel, Mountain Home, Idaho

Application October 16, 1944, Serial No. 558,870

3 Claims. (Cl. 188—142)

This invention relates to a trailer brake and more particularly to such a brake adapted to be operated by the momentum of the trailer when the towing car is braked.

A primary object of this invention is the provision of an improved trailer brake actuated automatically by the forward momentum of the trailer, to apply the brakes to the trailer simultaneously with the application of the brakes to the towing vehicle.

An additional object is the provision in association with such a trailer brake of a manual hand brake adapted to be operated independently of the automatic brake feature.

A still further object is the provision in such a device of means for rendering the automatic brake inoperative under desired circumstances, as when the trailer is being backed.

A still further object is the provision of improved means whereby the operation of the hand brake will not act to disalign the parts comprising the automatic braking system.

Still further objects reside in the arrangements of parts, combinations of elements, and features of construction, all as will be more fully pointed out hereinafter and shown in the accompanying drawings, wherein there is disclosed a preferred embodiment of this inventive concept.

In the drawings:

Figure 1 is a side elevational view of one form of device embodying features of this invention.

Figure 2 is a top elevational view of the device shown in Figure 1.

Figure 3 is a sectional view taken substantially along the line 3—3 of Figure 2.

Figure 4 is an enlarged perspective detail view of one constructional element of the device.

Figure 5 is an enlarged sectional view taken substantially along the line 5—5 of Figure 3 as viewed in the direction indicated by the arrows, and Figure 6 is an enlarged perspective view of an additional constructional detail.

Like reference numerals refer to like parts throughout the several views of the drawings.

Having reference now to the drawings, there is shown at 10 a trailer tongue of hollow construction which may be either rectangular or circular in cross-sectional configuration, and from one end of which extends an extremity of a towing rod 11 having a suitable socket joint 12 adapted to be engaged with a ball 13 affixed in any suitable manner to a portion 14 of a towing vehicle. Positioned within an extremity of tongue 10 is, as best shown in Figure 3, a sleeve comprised of a block 15 of a configuration adapted to conform closely to the interior of tongue 10 and secured in position as by anchor bolts 16 passed through suitable apertures in tongue 10 and a third horizontal anchor bolt 17 passed through a depending tongue 18 secured to the extremity of sleeve 15 and engaging in a threaded aperture in a depending lug 19 secured to trailer tongue 10. The interior of sleeve 15 is provided with a transverse bore 20 into which an end of rod 11 is adapted to extend, the same being freely slidable therein. A towing stop 21 is fixedly secured to the end of rod 11 interiorly of sleeve body 15, and is adapted by its abutment with the inner end of sleeve body 15 to permit the trailer to be towed by rod 11. Likewise, the interior end of rod 11 is provided with a bore or recess 25 within which is adapted to be positioned one end of a push rod 26, the same being freely slidable therein for a purpose to be described hereinafter. The other end of rod 26 is threadedly secured to a member 27 having a socket 28 therein adapted to engage a ball 29 to form a ball and socket connection, with an actuating lever 30. Actuating rod 30 is, as best shown in Figures 4 and 5, comprised of a transverse portion and an angularly disposed portion 31 adapted to extend outwardly of trailer tongue 10 as through a suitable slot 32 (see Figure 1), and has one extremity suitably secured as by a pivot pin 33 to a bracket 34 extending from a flange 35 secured to the side of trailer tongue 10. An intermediate portion of angularly disposed portion 32 is pivotally secured as by a pivot 36 to a bracket 37 secured to the end of the actuating rod 38 of a master brake cylinder 39 suitably secured to flange 35.

A second flange 40 is likewise secured to the side wall trailer tongue 10 and has an aperture therethrough through which is passed an end of a threaded member 41 provided with an adjustable nut 42, the opposite end of threaded member 41 being adapted to engage with a relatively heavy tension spring 43 having its other end suitably connected as by a member 44 to a portion of angularly disposed extension 31 positioned inwardly with respect to pivots 33 and 36.

From the foregoing it will now be seen that when the brakes are applied to the towing vehicle the momentum of the trailer permits the trailer tongue to ride forwardly along rod 11, the same sliding in bore 20 and that such forward movement occasions, through ball and socket joint 28—29, a movement of lever 30 transversely through slot 32 which, in turn, exerts pressure on actuating rod 38 to apply pressure to the trailer brakes through master brake cylinder 39. It will also be seen that the tension of spring 43 is sufficient, as set by adjusting nut 42 to preclude the actuating of the trailer brakes by normal gradual deceleration of the towing vehicle, such application being effected only when there is a comparatively sudden deceleration such as would normally be occasioned by the application of the brakes of a towing vehicle.

Suitable means are also provided for actuating the trailer brake mechanism manually when desired. Such means take the form of an actuating rod 50 slidably mounted in a sleeve or cylinder 51 secured to the side of the trailer tongue 10, the end of the rod being positioned normally in abutting relation with a portion of actuating lever 30 adjacent slot 32. The opposite end of rod 50 is pivotally secured as by a pivot pin 52 to a rod 53 which, in turn, is pivotally secured to an actuating handle or brake lever 54 pivoted as at 55 to a conventional quadrant 56, means being provided in conventional manner for latching lever 54 in any desired position of adjustment. It will now be seen that movement of brake lever 54 in a clockwise direction moves the end of brake actuating rod 50 inwardly to force lever 31 and hence brake rod 38 inwardly with respect to master brake cylinder 39 thus effectively setting the brakes. It may here be pointed out that the free movement of the end of rod 26 in bore 25, permits this latter operation to be effected without any undue exertion of force, such as might otherwise be required to move either the trailer or the towing vehicle were this connection fixed.

It may also be pointed out that adjusting means comprising a locking bolt 60 extending through suitable projecting lugs 61 in member 27 are provided to permit the suitable positioning of the threaded end of rod 26 to allow the requisite amount of play of the opposite end thereof in bore 25.

When it is desired to back the trailer, or for other reasons to render the automatic braking system inoperative, suitable means are provided to preclude such operation, such means taking the form of a pin 65 adapted to be passed through a suitable aperture 66 in rod 11 exteriorly of the end of sleeve 15 and trailer tongue 10, the abutting relation of the pin with the outer extremity of the tongue and sleeve precluding inward movement of rod 11 in such manner as to apply the brakes.

If desired, a suitable grease cup or lubricant fitting 67 may be provided, passed through a wall of tongue 10 and sleeve 15 into communication with bore 20 to provide suitable lubricant for the movement of rod 11 therein.

Now from the foregoing it will be seen that there is herein provided a trailer brake accomplishing all the objects of this invention and others including many advantages of great practical utility and commercial importance.

As many embodiments may be made of this inventive concept, and as many modifications may be made in the embodiment hereinbefore described and shown in the accompanying drawings, it is to be understood that all matter herein is to be interpreted merely as illustrative and not in a limiting sense.

I claim:

1. In a device of the character described, in combination, a trailer tongue, a brake cylinder secured thereto, a sleeve in said tongue, a rod slidable in said sleeve, said rod having an end adapted to be secured to a towing vehicle, means including a second rod and a lever pivotally secured thereto, operable by the momentum of said trailer and actuated by said rod for operating said brake cylinder, auxiliary, manually operable means for actuating said brake cylinder, and means permitting operation of said last-mentioned means without movement of said rod, said last-mentioned means comprising a sliding connection between said first and second rods.

2. In a device of the character described, in combination, a trailer tongue, a brake cylinder secured thereto, a sleeve in said tongue, a rod slidable in said sleeve, said rod having an end adapted to be secured to a towing vehicle, means including a second rod and a lever pivotally secured thereto, operable by the momentum of said trailer and actuated by said rod for operating said brake cylinder, auxiliary, manually operable means for actuating said brake cylinder, and means permitting operation of said last-mentioned means without movement of said rod, said last-mentioned means comprising a sliding connection between said first and second rods, and means for locking said first-mentioned rod in inoperative position to preclude operation of the brake cylinder by the momentum of said trailer.

3. In a device of the character described, in combination, a trailer tongue, a brake cylinder secured thereto, a sleeve in said tongue, a rod slidable in said sleeve, said rod having an end adapted to be secured to a towing vehicle, means including a second rod and a lever pivotally secured thereto, operable by the momentum of said trailer and actuated by said rod for operating said brake cylinder, and means permitting relative adjustment of the connection between said second rod and said lever to vary the effective length of said second rod, auxiliary, manually operable means for actuating said brake cylinder, and means permitting operation of said last-mentioned means comprising a sliding connection between said first and second rods.

CHARLES BUCKEL.